US011964364B1

(12) United States Patent
Bentley

(10) Patent No.: US 11,964,364 B1
(45) Date of Patent: Apr. 23, 2024

(54) VISE JAW INSERT SPRING-LOADED WASTE SHIELD AND CLEANING AID

(71) Applicant: Dean H. Bentley, Saint Joseph, MN (US)

(72) Inventor: Dean H. Bentley, Saint Joseph, MN (US)

( * ) Notice: Subject to any disclaimer, the term of this patent is extended or adjusted under 35 U.S.C. 154(b) by 282 days.

(21) Appl. No.: 17/588,095

(22) Filed: Jan. 28, 2022

Related U.S. Application Data

(60) Provisional application No. 63/144,464, filed on Feb. 1, 2021.

(51) Int. Cl.
*B25B 1/24* (2006.01)
*B25B 1/10* (2006.01)

(52) U.S. Cl.
CPC ................ *B25B 1/24* (2013.01); *B25B 1/103* (2013.01)

(58) Field of Classification Search
CPC ....... B25B 1/24; B25B 1/2457; B25B 1/2478; B25B 1/103; B25B 5/068; B25B 5/10; B25B 5/102; B23Q 11/08; B23Q 11/0825; B23Q 3/066
USPC .......................................................... 269/242
See application file for complete search history.

(56) References Cited

U.S. PATENT DOCUMENTS

| | | | |
|---|---|---|---|
| 53,821 | A | 4/1866 | Henworth |
| 78,565 | A | 6/1868 | Backus |
| 91,068 | A | 6/1869 | Backus |
| 104,541 | A | 6/1870 | Beck |
| 416,959 | A | 12/1889 | Sheppard |
| 419,072 | A | 1/1890 | Richards |
| 849,904 | A | 4/1907 | Kovacs |
| 1,753,924 | A | 4/1930 | William |
| 1,811,299 | A | 6/1931 | Brockhaus, Jr. |
| 2,205,674 | A | 6/1940 | Schroeder |
| 2,349,291 | A | 5/1944 | Leo |
| 2,384,512 | A | 9/1945 | Wiken et al. |

(Continued)

FOREIGN PATENT DOCUMENTS

| | | | | |
|---|---|---|---|---|
| CN | 109333100 A | * | 2/2019 | ............. B23Q 3/066 |
| DE | 336930 C | | 5/1921 | |

(Continued)

OTHER PUBLICATIONS

CN-109333100-A translation (Year: 2019).*

*Primary Examiner* — Abbie E Quann
(74) *Attorney, Agent, or Firm* — Albert W. Watkins

(57) ABSTRACT

A spring-loaded waste shield and cleaning aid has a moving block, a fixed block, a blocking flange, and at least one spring and linear bearing that form an elastically biased friction fitting plate. When inserted between vise jaws, the friction fitting plate will compress and expand so that a work piece can be clamped in the vise or removed without the plate falling out. The friction-fitting plate provides a work-underlying shelf that: shields function-critical vise components from machining waste and is readily cleaned; supports and positions a work piece; will catch small parts, tools, or the like accidentally dropped onto the shelf for easy retrieval; and is sacrificial in the event of accidental impact or contact with a machining tool or other mishap. In some embodiments, parallelepiped geometry, a socket head shoulder bolt, and appropriately sized components ensure that force overload applied by a vise does not damage the apparatus.

20 Claims, 3 Drawing Sheets

(56) References Cited

U.S. PATENT DOCUMENTS

| | | | |
|---|---|---|---|
| 2,429,801 | A | 10/1947 | Butler |
| 2,499,124 | A | 2/1950 | Zipp et al. |
| 2,903,840 | A | 9/1959 | Teupel et al. |
| 3,575,406 | A | 4/1971 | Viollet |
| 5,163,662 | A | 11/1992 | Bernstein |
| 5,222,997 | A | 6/1993 | Montgomery |
| 5,442,844 | A | 8/1995 | Swann |
| 5,634,253 | A | 6/1997 | Swann |
| 5,918,869 | A | 7/1999 | Christeson |
| 6,024,352 | A | 2/2000 | Albrecht |
| 6,036,184 | A | 3/2000 | Wurthele |
| 6,254,076 | B1 | 7/2001 | Goldin |
| 2008/0054542 | A1 | 3/2008 | Gelbart |
| 2010/0164159 | A1 | 7/2010 | Wurthele |

FOREIGN PATENT DOCUMENTS

| | | | |
|---|---|---|---|
| DE | 830445 | C | 2/1952 |
| DE | 102012208720 | B4 | 11/2013 |
| EP | 1688219 | A1 | 8/2006 |
| EP | 2143526 | A1 | 1/2010 |
| FR | 675976 | A | 2/1930 |
| FR | 947469 | A | 7/1949 |
| FR | 2446695 | B1 | 5/1982 |
| WO | WO 2006133755 | A1 | 12/2006 |

* cited by examiner

VISE JAW INSERT SPRING-LOADED WASTE SHIELD AND CLEANING AID

CROSS REFERENCE TO RELATED APPLICATIONS

The present application claims the benefit of U.S. provisional patent application 63/144,464 filed Feb. 1, 2021 of like title and inventorship, the teachings and entire contents which are incorporated herein by reference.

BACKGROUND OF THE INVENTION

1. Field of the Invention

The present invention pertains generally to the field of machine vises, and more particularly to an adjunct cooperative therewith to facilitate proper functioning while simplifying cleaning.

2. Description of the Related Art

Machine vises are commonly used to clamp and thereby fixedly support work pieces firmly into a position, such as on a machining table of a machine tool. These machine vises typically include a base or body which supports a fixed jaw, and a screw spindle that drives a slide carrying a clamping jaw into or away from the fixed jaw. Other types of vises are known as well that move both opposed jaws, and the present invention pertains equally well thereto. Vises and related clamping and gripping devices are commonly adjusted manually by turning a handle to drive the screw, or alternatively by an electric, pneumatic, hydraulic, or like drive.

When machining a workpiece constrained within the vise, large quantities of small chips, cuttings, or shavings that are removed from the workpiece drop into the gap between the vise jaws. Unfortunately, this gap is the same region where the screw spindle and bearings or bushings are most commonly located. This means that the chips and other cuttings, any machine oil or coolant, and other machining waste accumulate on the screw spindle, jaws, bearings or bushings and the like. Operating the screw spindle without removing the cuttings and other machining waste can lead to inconsistent operation and jamming, and will prematurely wear the vise. Consequently, when a machining operation is completed, the machine vise must be diligently cleaned to remove the machining waste.

In an effort to avoid this need to repeatedly and carefully clean the vise structure, one approach heretofore has been to provide wipers or seals that are designed to prevent the ingress of machining waste into critical vise components. Unfortunately, these seals and wipers generally tend to trap and collect the very particles that they are designed to prevent from ingressing into the vise components. In the case of elastomeric or resilient seals, the machine waste can become imbedded in the seal. With movement of the vise components, the embedded machine waste actually accelerates wear of the vise, rather than providing the intended protection. Further, such seals are generally very hard to clean. As a result, the industry has instead generally opened up access so that a machinist can completely clean critical components after each machining operation.

While a rag could be used to wipe exposed surfaces, the rag will quickly become laden with machining particles and debris. Further, a rag does not facilitate removal of debris from interior angles and pockets within the vise such as those formed by the vise screw thread and bushing. Instead, most commonly, compressed air is used to blow machining waste out of the vise's screw spindle and from around the jaws to prevent binding of the screw or other mechanisms. Many vises are designed with this intent, to allow the compressed air to flow through openings and carry away machining waste. Unfortunately, owing in part to the complex geometry of the screw spindle, jaws, and other vise structure, blowing off the vise very unpleasantly sprays metal cuttings and oil all over the work area, all too commonly including into the face of the machine operator, while consuming substantial time with each and every readjustment of the vise. In addition, and depending upon the vise geometry and degree of care taken by the machinist during cleaning, the compressed air can in some instances drive the machining waste deeper into smaller openings or voids in the vise structure, again eventually leading to jamming or other failure.

Recognizing the limitations of wipers and seals, and the hazards and time consumed using compressed air to clean a vise, some artisans have proposed telescopic pipe sleeves to shield the vise. Exemplary US and Foreign patents and published patent applications, the teachings which are incorporated herein by references, include: U.S. Pat. No. 53,821 by Henworth, entitled "Vise"; U.S. Pat. No. 78,565 by Backus, entitled "Vise"; U.S. Pat. No. 91,068 by Backus, entitled "Vise"; DE336930C by F. Aeschbach A G, entitled "Parallel vice"; FR675976A by Trouillas, entitled "Clamping system for various vice jaws"; and FR947469A by Guillaix, entitled "Bench or wall vise". These telescopic sleeves have a pipe or similar tubular structure that surrounds and thereby encloses the screw that moves the vise jaw back and forth. The benefit of a telescopic pipe is that it allows for a full range of jaw travel, and protects the screw and bushings from oil and metal shards. However, the telescopic pipe sleeves are subject to possible damage from either heavy work pieces falling on them, or from tool impacts cutting into the sleeve. If the telescopic pipe sleeve is damaged, the only way to replace the damaged sleeve is to disassemble the vise, replace the telescopic sleeve, and then reassemble the vise.

Other artisans have proposed the addition of a sliding plate protector that is located below the work piece and above the vise screw. Exemplary US and Foreign patents and published patent applications, the teachings which are incorporated herein by references, include: U.S. Pat. No. 104,541 by Beck, entitled "Vise"; U.S. Pat. No. 849,904 by Kovacs, entitled "Vise"; U.S. Pat. No. 1,811,299 by Brockhaus, Jr., entitled "Vise"; U.S. Pat. No. 2,499,124 by Zipp et al, entitled "Apparatus for protecting operating parts of vises from chips or other refuse incidental to machine work"; U.S. Pat. No. 5,442,844 by Swann, entitled "Apparatus for protecting internal elements of a workholding apparatus"; U.S. Pat. No. 6,036,184 by Wurthele, entitled "Clamping device, especially a machine vice"; U.S. Pat. No. 6,254,076 by Goldin, entitled "Telescopically extending and retracting device for the protection of moving machine parts"; 2010/0164159 by Wurthele, entitled "Clamping device"; DE102012208720B4 by Schraeder et al, entitled "Clamping and gripping device"; EP1688219A1 by Gernand et al, entitled "Clamping device with cover element for its spindle recess"; and, WO2006133755A1 by Gernand et al, entitled "Clamping device". These plates create a barrier to the entry of machining waste into the screw, and provide a smooth surface that is much easier to blow off than the vise screw, both which are of much benefit. As beneficial as the plates are, unfortunately the sliding plate protectors require a vise that has been manufactured to hold one or more of these sliding plates. This limitation both increases the complexity of the vise and eliminates any ability to retrofit an existing machining vise. In addition, while the plate protects the screw, the plate must also slide relative to a fixed portion of the vise, meaning the addition of the plate creates a new contact area between the sliding plate and the fixed portion of the vise that is unprotected. This means that metal shavings and other machining waste can still get lodged in this difficult to access sliding contact area, and as a result the accumulated waste can lead to premature wear or potentially cause a jam. The plate also creates a large and rigid shelf that serves as a dangerous hazard in the event of contact with a machining tool. Finally, if damaged or jammed, in many of the designs the plate can be very difficult to remove and replace, again requiring significant disassembly and reassembly.

In an effort to avoid any exposed bushings or other sliding surfaces that can be hard to clean and which can ultimately jam, other artisans have proposed the addition of a protective bellows that is located below the work piece and encompasses the vise screw. Exemplary US and Foreign patents and published patent applications, the teachings which are incorporated herein by references, include: U.S. Pat. No. 2,384,512 by Wiken et al, entitled "Machine protective apparatus": U.S. Pat. No. 2,903,840 by Teupel et al, entitled "Arrangement for protecting guiding members against dust and the like": DE830445C by Arno, entitled "Harmonica-shaped bellows as guideway protector on machine tools or the like"; and FR2446695A1 by Duloir, entitled "Perfected vice for machining in polluted environments". The benefit of the bellows protectors is they do not have any sliding components, so they are not subject to jamming due to deforming impacts or material accumulating within the bushings or other points of sliding contact. Furthermore, they protect the drive screw and associated bushing from metal shavings and other machining waste. However, the bellows are generally made from a soft and pliable materials, such as cloth or rubber, which will wear quickly during use and which may in fact collect machining waste as the metal shavings and the like impinge upon and penetrate into the bellows. Furthermore, soft and resilient bellows material will immediately fail in the case of a tool coming into contact with it, and so provides no protection to the screw from an accidental impact from either work piece or machining tool. Also, like the telescopic pipe sleeves and sliding plate protectors, substantial disassembly is required to replace a damaged bellows protector.

In addition to the desire to improve the reliability of a vise and simplify the cleaning thereof, machinists have also recognized that efficiency can in some cases also be improved by stacking multiple work pieces into a vise in a single vise opening and closing procedure. Each of the work pieces are then machined, without requiring the vise to be opened or closed until all of the work pieces have been appropriately machined. As a result, there is a single vise closing to capture the plurality of work pieces, a single vise opening to remove the stacked work pieces, and a single vise cleaning. Similarly, where multiple tools will be used to machine the work pieces, each tool will only need to be changed once to machine all of the stacked work pieces. One way to accomplish this is to provide a plurality of machinist's parallels between the vise jaws. These parallels can be used not only for stacking of parts, but also to assist in holding a workpiece at a specific position within the vise. Exemplary US patents and published patent applications, the teachings which are incorporated herein by references, include: U.S. Pat. No. 3,575,406 by Viollet, entitled "Machinist's parallels"; U.S. Pat. No. 5,918,869 by Christeson, entitled "Retaining parallels"; and, 2008/0054542 by Gelbart, entitled "Machine Vice with retractable parallels".

Two additional U.S. patents, the teachings which are incorporated herein by reference, include: U.S. Pat. No. 2,429,801 by Butler, entitled "Vise with auxiliary support"; and U.S. Pat. No. 416,959 by Sheppard, entitled "Vise". The Butler patent has a retractable shelf which underlies a work piece, allowing single handed operation of the vise for staging work. The shelf protects the screw from the work piece landing on it and the shelf is readily retractable, allowing for normal operation of the vise. The Sheppard patent, of similar construction, uses a similar spring driven plate to instead hold a work piece in place from the sides, to prevent over driving the clamping force and thereby damaging the workpiece. In both of these Butler and Sheppard patents, the shelf is extended via spring, but does not protect the screw from machining waste such as metal shavings. In addition, the retractable shelf creates additional sliding surfaces into which machining waste will penetrate, making cleaning more difficult and potentially disabling proper operation of the vise. Both of these Butler and Sheppard patents require a vise which has an opening in the jaws designed to accommodate the retractable shelf, and so cannot be used to readily retrofit an existing vise.

Additional patents of varying relevance, the relevant teachings and contents which are incorporated herein by reference, include: U.S. Pat. No. 419,072 by Richards, entitled "Milling machine vise"; U.S. Pat. No. 2,349,291 by Meister, entitled "Vise"; U.S. Pat. No. 5,163,662 by Bernstein, entitled "Multi-purpose machine vise"; U.S. Pat. No. 5,222,997 by Montgomery, entitled "Parallel holder device"; U.S. Pat. No. 5,634,253 by Swann, entitled "Apparatus for expanding the worksurface of a vise-like workholding apparatus"; U.S. Pat. No. 6,024,352 by Albrecht, entitled "Machine vise"; and EP2143526A1 by Mosig, entitled "Mounting device with purging means".

In addition to the foregoing patents, Webster's New Universal Unabridged Dictionary, Second Edition copyright 1983, is incorporated herein by reference in entirety for the definitions of words and terms used herein.

As may be apparent, in spite of the enormous advancements and substantial research and development that has been conducted, there still remains a need for a simply inserted and removable screw and bushing protector that: can be placed into any vise; will prevent metal shavings, oil, and other machining waste from sticking to the vise screw and damaging or otherwise interfering with the operation of the bushing or other part of the vise; and which will provide a work-underlying shelf that is sacrificial in the event of accidental impact or contact with a machining tool or other mishap. Further, such a device that works cooperatively with machinist's parallels to facilitate the stacking or positioning of work pieces within a vise is also desired.

SUMMARY OF THE INVENTION

Exemplary embodiments of the present invention solve inadequacies of the prior art by providing a spring-loaded waste shield and cleaning aid having the general geometry of a variable width parallelepiped block that is configured to be inserted within a vise or similar clamping apparatus between a pair of opposed vise jaws. The spring-loaded variable width block is preferably of length approximating the maximum width of the opposed vise jaws, thickness substantially less than the height of the vise jaws, and width somewhat greater than the width required to allow a workpiece to be inserted and removed from between the jaws of the vise in a space above the block. The spring-loaded variable width block most preferably has a generally smooth and planar top surface.

In a first manifestation, the invention is, in combination, a machine vise and a vise jaw insert spring-loaded waste shield and cleaning aid. The machine vise has a pair of opposed jaws that each define a contact face in a vertical plane, and a linear actuator reciprocating at least a first one of the pair of opposed jaws relative to a second one of the pair of opposed jaws. The vise jaw insert spring-loaded waste shield and cleaning aid has a fixed block defining a vertical planar first surface engaging the contact face of the first one of the pair of opposed jaws, and a horizontal planar second surface extending from the fixed block first surface. The fixed block second surface defines a covering over the machine vise actuator that is configured to support work pieces during a machining operation and to shield the machine vise actuator from machining waste generated during the machining operation. A moving block defines a vertical planar first surface engaging the contact face of the second one of the pair of opposed jaws, and a horizontal planar second surface extending from the moving block first surface that defines a covering over the machine vise actuator that is configured to support work pieces during the machining operation and configured to shield the machine vise actuator from machining waste generated during the machining operation. A linear bearing couples the moving block to the fixed block and defines a first axis of reciprocation of the moving block relative to the fixed block. A variable-width gap extends between the fixed block and the moving block along the first axis of reciprocation. A spring applies a spring force along the first axis of reciprocation to each of the fixed block and the moving block. The spring force is configured to secure the fixed block first surface to the contact face of the first one of the pair of opposed jaws through a range of reciprocating motion by at least the first one of the pair of opposed jaws relative to the second one of the pair of opposed jaws. The spring force is also configured to secure the moving block first surface to the contact face of the second one of the pair of opposed jaws through the range of reciprocating motion. The spring force is further configured to tend to separate the fixed block from the moving block. A blocking flange is unitary with and extends from the fixed block and covers the variable-width gap between the fixed block and the moving block and is thereby configured to shield the machine vise actuator from machining waste.

In a second manifestation, the invention is, in combination, a machine vise and a vise jaw insert spring-loaded waste shield and cleaning aid. The machine vise has a pair of opposed jaws, and an actuator moving at least a first one of the pair of opposed jaws relative to a second one of the pair of opposed jaws. The vise jaw insert spring-loaded waste shield and cleaning aid has a fixed block defining a fixed block first surface facing the first one of the pair of opposed jaws, and a fixed block second surface extending from the fixed block first surface. The fixed block second surface defines a covering over the machine vise actuator and is configured to shield the machine vise actuator from machining waste. A moving block defines a moving block first surface facing the second one of the pair of opposed jaws, and a moving block second surface extending from the moving block first surface. The moving block second surface defines a covering over the machine vise actuator and is configured to shield the machine vise actuator from machining waste. A linear bearing couples the moving block to the fixed block and defines a first axis of reciprocation of the moving block relative to the fixed block. A variable-width gap extends between the fixed block and the moving block along the first axis of reciprocation. A spring applies a force along the first axis of reciprocation that secures the fixed block first surface to the first one of the pair of opposed jaws, secures the moving block first surface to the second one of the pair of opposed jaws, and tends to separate the fixed block from the moving block. A blocking flange covers the variable-width gap between the fixed block and the moving block and is thereby configured to shield the machine vise actuator from machining waste.

In a third manifestation, the invention is a vise jaw insert spring-loaded waste shield and cleaning aid. The vise jaw insert has a generally rectangular parallelepiped fixed block defining a vertical planar first surface configured to engage with a contact face of a first one of a pair of opposed vise jaws, and a horizontal planar second surface extending from the fixed block first surface. The fixed block second surface is configured to define a covering over and thereby shield a machine vise actuator from machining waste generated during a machining operation. A generally rectangular parallelepiped moving block defines a vertical planar first surface configured to engage with a contact face of a second one of the pair of opposed jaws, and a horizontal planar second surface extending from the moving block first surface. The moving block second surface is configured to define a covering over and thereby shield the machine vise actuator from machining waste generated during the machining operation. A linear bearing couples the moving block to the fixed block and defines a first axis of reciprocation of the moving block relative to the fixed block. A variable-width gap extends between the fixed block and the moving block along the first axis of reciprocation. A spring applies a spring force along the first axis of reciprocation to each of the fixed block and the moving block. The spring force is configured to secure the fixed block first surface to the contact face of the first one of the pair of opposed jaws through a range of reciprocating motion by at least the first one of the pair of opposed jaws relative to the second one of the pair of opposed jaws. The spring force is also configured to secure the moving block first surface to the contact face of the second one of the pair of opposed jaws through the range of reciprocating motion. The spring force is further configured to tend to separate the fixed block from the moving block. A plate-shaped blocking flange is unitary with and extends from a one of the fixed block and the moving block, and covers the variable-width gap between the fixed block and the moving block and is thereby configured to shield the machine vise actuator from machining waste generated during the machining operation.

OBJECTS OF THE INVENTION

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a spring-loaded waste shield and cleaning aid that can be simply inserted between and removed from the jaws of many different types of prior art vises. As a corollary thereto, an object of the invention is to provide an elastically biased friction fitting plate that, when inserted between the jaws of a vise, will compress and expand between those vise jaws preferably such that a work piece can be clamped in the vise or removed without the plate falling out or exposing the vulnerable and non-planar vise components beneath. A second object of the invention is to shield function-critical vise components such as spindles, bushings, bearings, sliding plates, levers, and the like from metal shavings, oil, and other machining waste, to thereby preserve or extend operation of the vise. Another object of the present invention is to provide a generally smooth and planar work-underlying shelf that: can be used to support and position a work piece; which will catch small parts, tools, or the like that may be accidentally dropped onto the shelf for easy retrieval; which can be readily and thoroughly cleaned; and which is sacrificial in the event of accidental impact or contact with a machining tool or other mishap. A further object of the invention is to provide such a device that works cooperatively with machinist's parallels to facilitate the positioning of work pieces within a vise or the stacking of work pieces so multiple work pieces can be cut, milled, or drilled without readjustment of the vise jaws.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
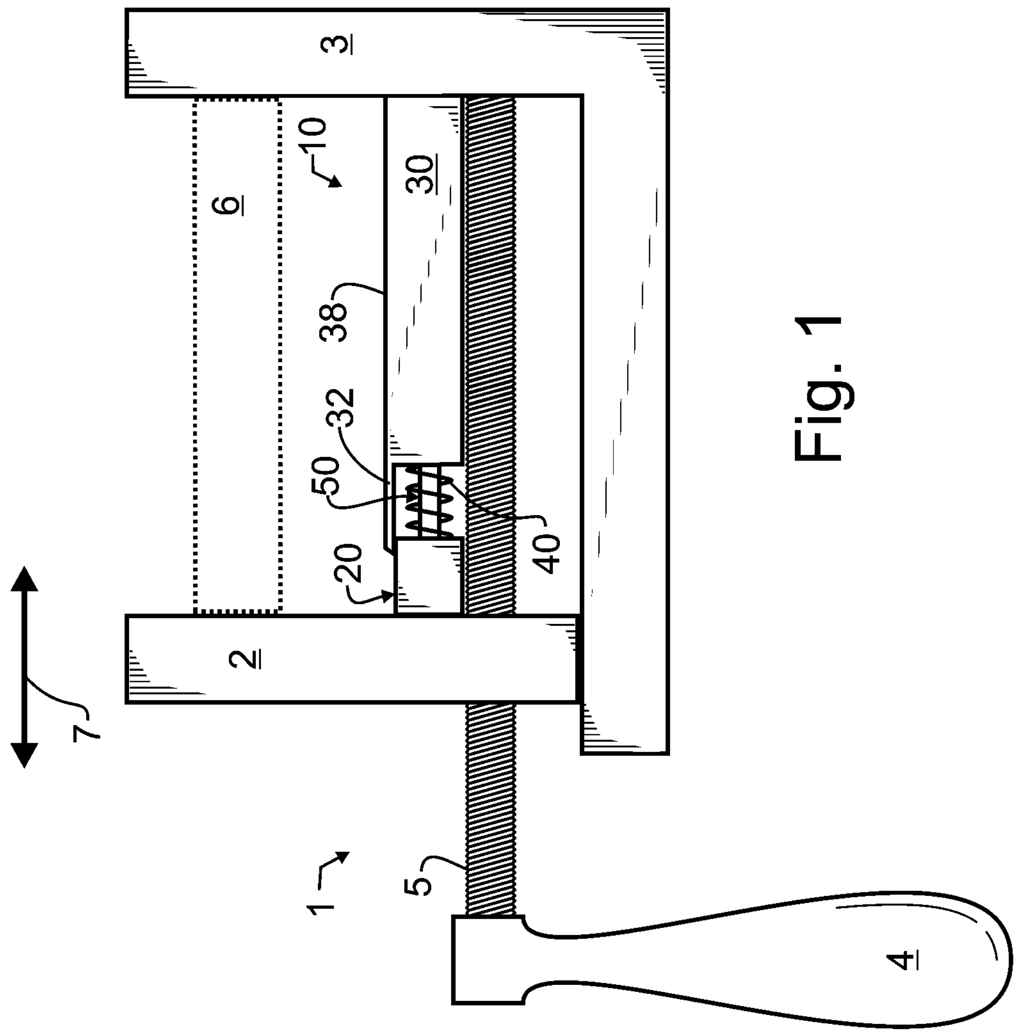
FIG. 1 illustrates a preferred embodiment vise jaw insert spring-loaded waste shield and cleaning aid designed in accord with the teachings of the present invention in combination with and inserted into a vise, from a side view.

Manifested in the preferred embodiment, the present invention provides a spring-loaded waste shield and cleaning aid that can be simply inserted between and removed from the jaws of many different types of prior art vises. In a preferred embodiment of the invention illustrated in FIG. 1, an exemplary prior art vise 1 has a moving jaw 2, a fixed jaw 3, handle 4, and screw spindle 5. The handle 4 is configured to rotate screw spindle 5, in turn moving the moving jaw 2 closer to or farther from fixed jaw 3, depending upon the direction of rotation of handle 4. Arrow 7 indicates the axis of reciprocation of movable jaw 2. While vise 1 is illustrated with a handle to drive the screw spindle and with one exemplary geometry and arrangement of components to facilitate the present disclosure, it will be understood that the present invention is applicable to both other geometries and constructions of vises, and to alternative drives that may be used to open and close the jaws, including electric, pneumatic, hydraulic, or like drives.

In accord with the teachings of the present invention, inserted into and used in combination with vise 1 is preferred embodiment vise jaw insert spring-loaded waste shield and cleaning aid 10. Preferred embodiment vise jaw insert spring-loaded waste shield and cleaning aid 10 has four major parts: a generally parallelepiped moving block 20; a generally parallelepiped fixed block 30 including a unitary plate-shaped blocking flange 32; a pair of springs 40; and a pair of socket head shoulder bolts 50. In combination, these major parts provide a variable width vise jaw insert that can be compressed or expanded. This ability to compress and expand allows preferred embodiment vise jaw insert 10 to friction fit between jaws 2, 3 through a limited range of opening and closing movements of vise 1.

A machinist will select a preferred embodiment vise jaw insert 10 that can be compressed through a range of travel that allows the insert to be compressed between jaws 2, 3 to a space smaller than an intended work piece such as work piece 6 will fit in, and which can expand through a range of travel that allows the insert to be under at least mild compression between jaws 2, 3 in a space large enough to easily insert and remove the work piece 6 from between jaws 2, 3. Once selected, the machinist will insert preferred embodiment vise jaw insert 10 between jaws 2, 3, prior to securing a work piece 6 therebetween. As evident from FIG. 1, preferred embodiment vise jaw insert 10 will preferably be placed in a lower portion of the space between jaws 2, 3 which will not be occupied by a work piece clamped between jaws 2, 3. As illustrated in FIG. 1, this may commonly be a lower portion of vise 1, for exemplary purposes just above screw spindle 5.

Owing to helical compression springs 40 being in slight compression when preferred embodiment vise jaw insert 10 is properly placed, there will be a force pressing moving block 20 against moving jaw 2, and an equal and opposite force pressing fixed block 30 against fixed jaw 3. This force keeps preferred embodiment vise jaw insert 10 in place through a friction fit, even when jaws 2, 3 are opened or closed sufficiently to allow work piece 6 to be inserted, clamped, released, and removed from jaws 2, 3. In consideration thereof, and appropriate only for some work pieces, it is also known in the industry to use machinist's parallels to support work pieces above the base of the vise, for various purposes. In some instances, preferred embodiment vise jaw insert 10 will provide support for machinist's parallels.

With a properly sized preferred embodiment vise jaw insert 10 held in place through a friction fit, the machinist will next open jaws 2, 3 sufficiently to allow work piece 6 to fit between, for exemplary and non-limiting purpose by rotating handle 4 in a first counter-clockwise direction. The machinist then inserts work piece 6 between vise jaws 2, 3, and subsequently closes vise jaws 2, 3 securely about work piece 6. Using the vise illustrated, again for exemplary purposes, this can be done by rotating handle 4 clockwise.

The machinist will then machine work piece 6, with vise 1 holding work piece 6 securely in a fixed position.

As can be expected, during the machining process material such as small chips, cuttings, or shavings removed from work piece 6 will drop into the gap between the vise jaws 2, 3. However, rather than contaminating screw spindle 5 and associated bearings or bushings or other mechanisms of vise 1, the chips and other cuttings, machine oil, and other machining waste will instead accumulate on the major planar top surface 38 of preferred embodiment vise jaw insert 10, or at least be redirected by top surface 38 away from the moving components of vise 1.

As a result, when the machinist is finished with the desired machining, the machinist may decide whether or not to use compressed air to blow off work piece 6 and the smooth top surface 38 to remove this accumulated waste. If the machinist decides to blow off the surfaces, the flat top of preferred embodiment vise jaw insert 10 is extremely easy to clean, and the machinist will not have to endure the prior art occasional spray of machining waste over their person.

The machinist will next open vise jaws 2, 3 sufficiently to allow work piece 6 to be removed from between jaws 2, 3. While work piece 6 is being removed, preferred embodiment vise jaw insert 10 will remain friction fit in place. If the machinist has additional work pieces of geometry similar to or of like dimension to work piece 6, the machinist will then insert the next work piece and repeat the process, without having to readjust preferred embodiment vise jaw insert 10 or clean the lower portions of vise 1. This means that screw spindle 5 and associated bearings or bushings remain clean and continue to function properly.

As may be appreciated, for repetitive machining of many parts of like or similar dimension, a significant amount of the machinist's time is normally spent clearing machining waste from vise 1 rather than machining the parts. This time is saved by preferred embodiment vise jaw insert 10, and any cleaning required or preferred is much less unpleasant.

Figure 2:
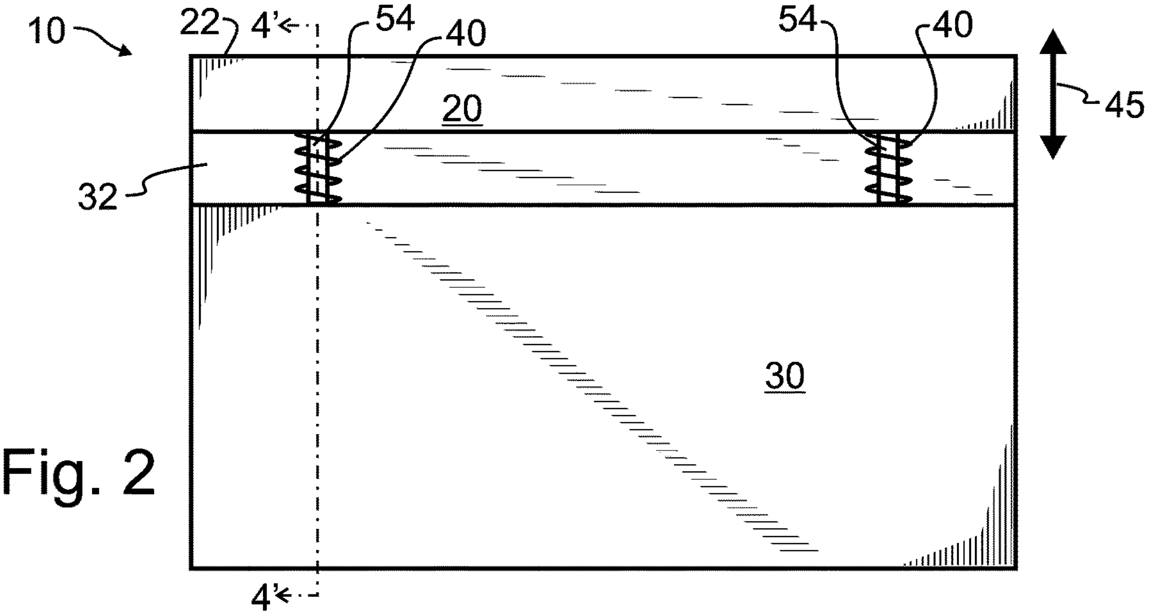
FIG. 2 illustrates a preferred embodiment vise jaw insert spring-loaded waste shield and cleaning aid of FIG. 1 from bottom plan view.
Figure 3:
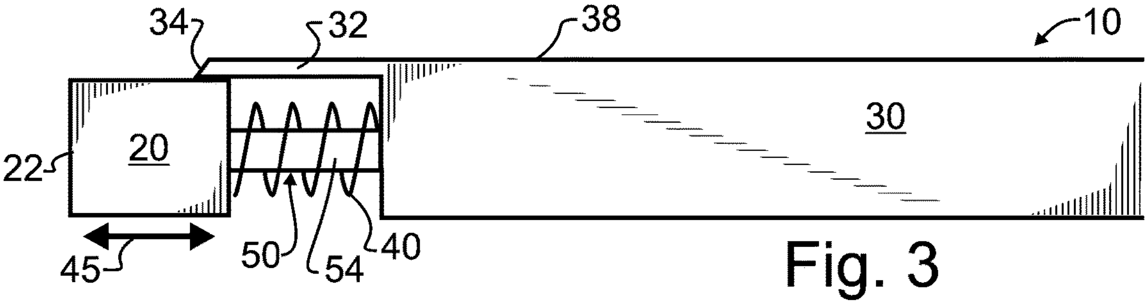
FIG. 3 illustrates the preferred embodiment vise jaw insert spring-loaded waste shield and cleaning aid of FIG. 1 from a side elevational view.

From the illustrations in FIGS. 1-3 and understood from the present discussion, preferred embodiment vise jaw insert 10 has the general geometry of a variable width parallelepiped block, including a length approximating the maximum width of the opposed vise jaws 2, 3, a thickness substantially less than the height of vise jaws 2, 3, and a variable spring-loaded width just greater than the width required to allow a workpiece to be inserted and removed from between the jaws of the vise in a space above the block. The length of preferred embodiment vise jaw insert 10 will be selected by the machinist for a particular work piece. If preferred embodiment vise jaw insert 10 extends from side edge to opposed side edge of the vise jaws 2, 3, the preferred embodiment vise jaw insert 10 will essentially form a floor between the jaws. In this case, the work piece will be inserted above preferred embodiment vise jaw insert 10, just as illustrated in FIG. 1.

Nevertheless, there may some work pieces that must hang or extend down, for exemplary purposes even lower than screw spindle 5. In such instances, and where possible and practical, the machinist may select a preferred embodiment vise jaw insert 10 that has a length less than the width of vise jaws 2, 3, but which is still sufficient to shield screw spindle 5 or other lower portions of vise 1 from machining waste.

While the thickness of preferred embodiment vise jaw insert 10 is not critical, it will be apparent that a relatively thinner insert will take up less vertical space within vise 1, thereby leaving more space available for a work piece. Nevertheless, if preferred embodiment vise jaw insert 10 is too thin, then it may be too susceptible to damage such as might occur when a work piece is accidentally dropped within the vise either during insertion or removal therefrom.

To provide a large planar top surface 38 that is easily cleaned, fixed block 30 will preferably be dimensioned to be of much larger width (left to right in FIGS. 3-5) than moving block 20. Moving block 20 will most preferably reciprocate relative to fixed block 30 along an axis parallel to the longitudinal axis of socket head shoulder bolt 50, as depicted by arrow 45. Moving block 20 will either slide relatively farther under or instead slide relatively more out from under blocking flange 32, depending upon the position of the supporting vise jaws 2, 3. Blocking flange 32 provides protective cover for springs 40 and socket head shoulder bolts 50, each which are visible from the bottom view of FIG. 2. Machining waste is at least initially collected either on planar top surface 38 or the top surface of moving block 20, both which are therefore preferably generally smooth planar surfaces. Since moving block 20 may slide under blocking flange 32 when contaminated with machining waste, such as when a fresh work piece is being inserted into vise 1 after a previous machining operation, a sloped or beveled vertical edge 34 is provided that will tend to lift any machining waste up off of moving block 20 and out of interference between moving block 20 and blocking flange 32.

Figure 4:
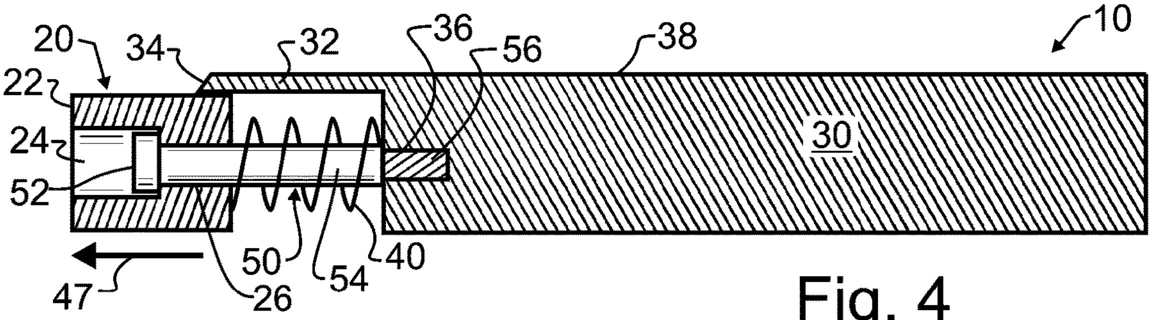
FIG. 4 illustrates the preferred embodiment vise jaw insert spring-loaded waste shield and cleaning aid of FIG. 1 from a sectional view taken along section line 4' of FIG. 2, and with the moving block in a fully extended position.
Figure 5:
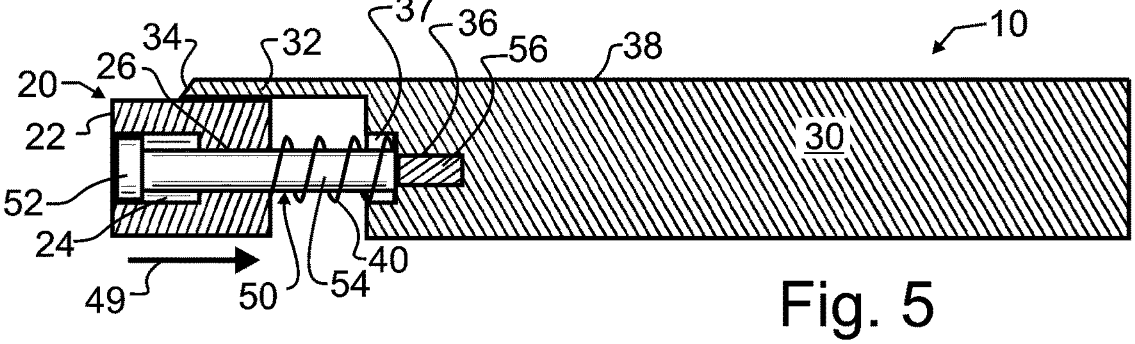
FIG. 5 illustrates the preferred embodiment vise jaw insert spring-loaded waste shield and cleaning aid of FIG. 1 from a sectional view taken along section line 4' of FIG. 2, with the moving block in a fully retracted position, and with an optional spring receiving chamber.

FIGS. 4 and 5 illustrate preferred embodiment vise jaw insert 10 from a sectioned side elevational view taken along section line 4' of FIG. 2 to illustrate the functioning of helical compression springs 40 in combination with socket head shoulder bolts 50. As visible in FIG. 4, socket head shoulder bolt 50 has a socket head 52 accessible through countersink 24 formed in moving block 20. While the type of bolt or bolt head is not critical to the operation of the present invention, a socket head allows for a compact head that can be very forcefully turned, if so required, while requiring only a minimal diameter. This socket head 52 thereby helps to keep preferred embodiment vise jaw insert 10 relatively thinner. Socket head shoulder bolt 50 passes through bore 26. Bore 26 and shoulder 54 are preferably cooperative in dimension and function to serve as a linear bearing, helping to guide moving block 20 in a reciprocating motion such as illustrated by the double-headed arrow 45 of FIG. 3. Threaded end 56 of bolt 50 distal to socket head 52 is preferably threaded into a threaded hole 36 in fixed block 30. Helical compression spring 40 surrounds shoulder 54 of bolt 50, and is compressed between moving block 20 and fixed block 30. As a result, spring 40 elastically biases moving block 20 away from fixed block 30, applying a force in the direction illustrated by arrow 47 in FIG. 4. A helical compression spring 40 is illustrated and described herein for exemplary and non-limiting purpose. Nevertheless, the mechanical arts are filled with a myriad of apparatus and spring-like members that provide elastic bias, suitable ones which will be recognized by those reasonably skilled in the art and understood to be incorporated herein.

Both socket head 52 and shoulder 54 are illustrated with three-dimensional shade lines, and helical compression spring 40 is drawn fully around shoulder 54 in both FIGS. 4 and 5. This has been done solely for purposes of clearer illustration and understanding of these features, though it will be understood from the foregoing description that socket head 52 and shoulder 54 would in fact be sectioned for these Figures. In consideration thereof, in a blue-print style drawing socket head 52 and shoulder 54 would be shown with cross-section fill just as threaded end 56 is shown, and helical compression spring 40 would also be cut.

FIG. 4 illustrates moving block 20 in a fully extended position, meaning it has traveled to the limit of expansive travel in the direction of force generated by spring 40 and indicated by arrow 47. The expansive travel limit is determined by the depth of countersink 24, meaning no more travel is possible when socket head 52 reaches the bottom of countersink 24, since socket head 52 has an outside diameter greater than the inside diameter of bore 26.

FIG. 5 illustrates moving block 20 in a fully compressed position, meaning it has traveled to the compressive limit of travel in the direction of arrow 49. This compressive travel limit is determined again by the depth of countersink 24 and the length of bolt 50. When the top of socket head 52 reaches vise contacting face 22, any further compression of the vise will apply the compression force directly to bolt 50 and through threaded end 56 to fixed block 30. In other words, when this limit has been reached, jaws 2, 3 of vise 1 should not be moved any closer together, or preferred embodiment vise jaw insert 10 may be permanently damaged. As may be apparent then, the maximum extent of reciprocation of moving block 20 in the direction indicated by arrow 45 of FIG. 3 is defined by the length of countersink 24 reduced by the dimension of socket head 52 parallel to this length. The maximum extent of reciprocation of moving block 20 in combination with the minimum dimension of preferred embodiment vise jaw insert spring-biased waste collector and cleaning aid 10 in a direction parallel to arrow 49 such as illustrated in FIG. 5 is used when selecting a suitable vise jaw insert 10 for use within vise 1 that will work cooperatively with a work piece 6 of particular dimension.

As an exemplary and non-limiting example, presume a workpiece 6 has a dimension of one inch in a direction parallel to arrow 49. Most preferably, a preferred embodiment vise jaw insert spring-biased waste collector and cleaning aid 10 will be selected that has a compressive limit in a direction parallel to arrow 49, such as illustrated in FIG. 5, to a dimension less than one inch, but will also expand to an expansive limit such as illustrated in FIG. 4 to a dimension greater than one inch. When so designed and selected, then vise 1 may be opened sufficiently to release work piece 6 from between vise jaws 2, 3, while preferred embodiment vise jaw insert 10 will still be frictionally retained between vise jaws 2, 3 by a force generated by springs 40.

FIG. 5 also illustrates an optional spring receiving chamber 37 formed in fixed block 30 adjacent to threaded hole 36. In some alternative embodiments, moving block 20 has a greater width, such that at the limit of travel in the direction illustrated in FIG. 5, the vertical face of moving block 20 distal to vise contacting face 22 will engage with the vertical face of fixed block 30 adjacent to spring receiving chamber 37. To enable this, spring 40 will be compressed entirely into spring receiving chamber 37. A benefit of this arrangement is that the portion of force applied to close jaws 2, 3 of vise 1 that is greater than the spring constant, and which could damage the spring at the compressive limit of travel, is transmitted through the body of moving block 20 and the body of fixed block 30 thereby circumventing the spring and significantly reducing the likelihood of damaging preferred embodiment vise jaw insert 10.

In alternative embodiments, instead of smooth and planar surfaces formed on moving block 20 and fixed block 30, a protrusion is formed on or protruding member added to at least one of the two opposed faces. When the compressive limit of travel of moving block 20 toward fixed block 30 is reached, one or more protrusions engage and thereby transmit a force component applied by screw spindle 5 or other linear actuator along the axis of reciprocation of moving block 20 that is greater than said force applied opposite thereto by said spring from moving block 20 to fixed block 30, thereby circumventing the spring. As a result, forces greater than the spring constant, which could damage the spring, are diverted through the protrusion(s). While such diversion protects the spring, it is noteworthy that in the embodiment of FIG. 5, most of the opposed faces of moving block 20 and fixed block 30 will carry the force, meaning a very large force can be transmitted before any damage will occur. In contrast, a smaller protrusion would in most cases not be capable of transmitting as much force, and so would be more likely to be damaged.

Figure 6:
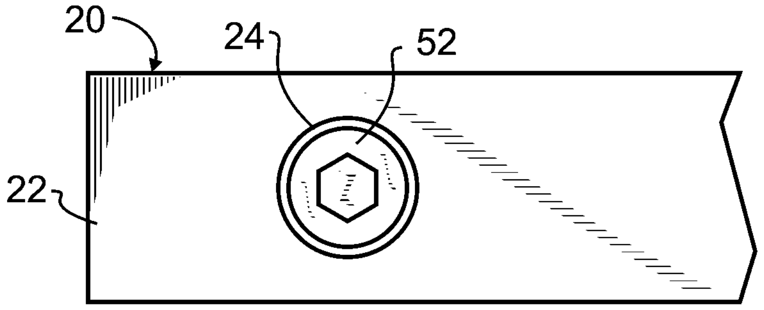
FIG. 6 illustrates the preferred embodiment vise jaw insert spring-loaded waste shield and cleaning aid of FIG. 1 from an enlarged and therefore partial front view.

FIG. 6 illustrates a portion of vise contacting face 22 in the outer region thereof and including one countersink 24 with socket head 52 visible therein, from a front elevational view. As aforementioned, the thickness of preferred embodiment vise jaw insert 10, shown as elevation in FIG. 6, is primarily limited by the diameter of socket head 52.

As should now be better appreciated, when preferred embodiment vise jaw insert 10 is properly placed, vise contacting face 22 will contact one of the vise jaws 2, 3, while the distal vertical face of fixed block 30 will contact the other of vise jaws 2, 3. Helical compression springs 40 will spring load preferred embodiment vise jaw insert 10 into contact with both jaws through a range of motion between the limits of position illustrated by FIGS. 4 and 5.

If the preferred embodiment illustrated in FIG. 1, movable jaw 2 that engages vise contacting face 22 is smooth or is at least smooth in the region adjacent to countersink 24. As a result, when preferred embodiment vise jaw insert 10 is held between jaws 2, 3, at least a partial seal is formed between movable jaw 2 and vise contacting face 22. Machining waste is thereby blocked from entering into countersink 24.

In some alternative embodiments, either movable jaw 2, an intermediate jaw, or a machinist's parallel may be provided that is either smooth or otherwise configured to engage with vise contacting face 22 to create a suitable seal therebetween. In further alternative embodiments, a partial or complete seal is achieved by appropriate selection of mating geometries, particular materials, insertion of gaskets, and other features or combination of features that are known in the mechanical arts to partially or completely prevent the ingress of machining fluid and waste into countersink 24. Nevertheless, for most purposes a simple planar contacting face 22 that mates with a planar portion of moveable jaw 2 will provide adequate resistance to the ingress of machining waste. This in most instances will also be sufficient to facilitate easy cleaning of the combined vise 1 and preferred embodiment vise jaw insert 10 subsequent to a machining operation.

As already noted herein above, the width of moving block 20, depth of countersink 24, and height of socket head 52 will determine the amount of jaw movement that can be accommodated while still maintaining adequate spring load to retain preferred embodiment vise jaw insert 10 between jaws 2, 3. Nevertheless, increasing the width of moving block 20 and depth of countersink 24 cannot be achieved without also factoring in the increased span of already relatively thin blocking flange 32 and the amount of torque or twisting that could be applied to bolt 50 tending to misalign the longitudinal axis of bolt 50 from the longitudinal axis of threaded hole 36. Severe misalignment of the longitudinal axis of bolt 50 from the longitudinal axis of threaded hole 36 will lead to damage. This means there are reasonable limits within the design of preferred embodiment vise jaw insert 10. To provide an apparatus that can span widely varying dimensions of different work pieces, a plurality of preferred embodiment vise jaw inserts 10 are preferably provided, each with a different optimum width. For exemplary and non-limiting purpose, this may be accomplished by providing wider and narrower fixed blocks 30, while otherwise generally preserving the dimension and operation of the remaining components of preferred embodiment vise jaw insert 10.

While socket head shoulder bolt 50 is preferred, since it inherently provides a number of functional features desired and required for proper operation of the preferred embodiment in a commercially available component, those skilled in the mechanical arts will recognize that other linear bearings are known that in alternative embodiments will be substituted therefore. Nevertheless, if a linear bearing is selected that does not inherently provide a maximum limit of expansive travel or spring bias or other force in such direction, such features will preferably be provided through other means known in the mechanical arts.

Top surface 38 is illustrated and described herein as being generally planar, which simplifies construction, facilitates cleaning thereof, and provides a shelf that is used in some machining applications to support one or more work pieces 6. Each of these benefits are preferred. Nevertheless, consideration solely for shielding function-critical components of vise 1 has fewer requirements. Consequently, in some alternative embodiments, top surface 38 will be shaped to improve the shedding of liquids. In some of these alternative embodiments top surface 38 is domed, in others of these alternative embodiments top surface 38 comprises two surfaces that rise from the edges to a peak or crest therebetween, for exemplary and non-limiting purpose such as in the manner of a pitched roof or the like, and in yet others of these alternative embodiments one or more drainage grooves, ditches, or channels are provided in an otherwise generally planar top surface 38.

Various embodiments of vise jaw inserts designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figure 7:
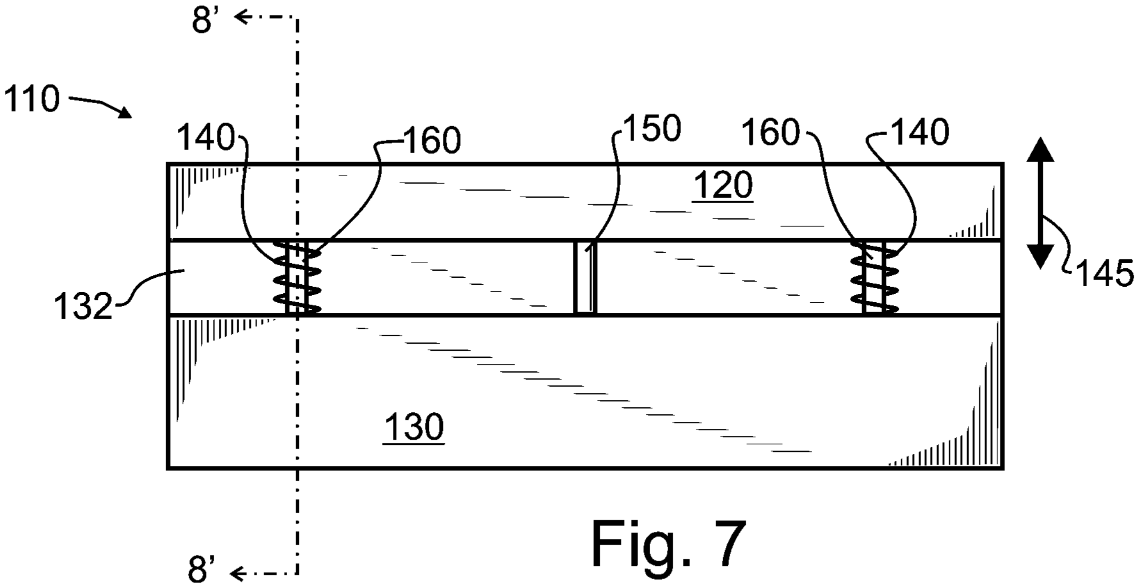
FIG. 7 illustrates a first alternative embodiment vise jaw insert spring-loaded waste shield and cleaning aid from bottom plan view.
Figure 8:
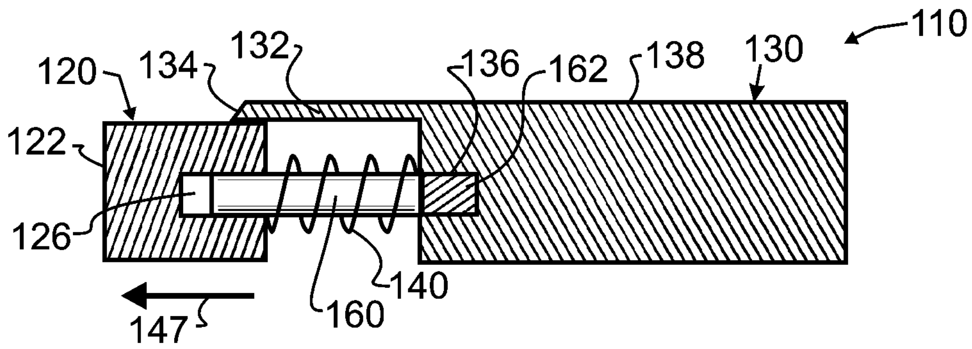
FIG. 8 illustrates the first alternative embodiment vise jaw insert spring-loaded waste shield and cleaning aid of FIG. 7 from a sectional view taken along section line 8' of FIG. 7, and with the moving block in a fully extended position.

An alternative embodiment vise jaw insert spring-loaded waste shield and cleaning aid 110 is illustrated in FIGS. 7 and 8 that is similar to preferred vise jaw insert spring-loaded waste shield and cleaning aid 10, in that it also has four major parts: a moving block 120; a fixed block 130; linear bearings defined by bolt 150 and pins 160; and springs 140. The primary difference is that there are three sets of linear bearings provided therein. An inner socket head shoulder bolt 150 is of like construction to that of bolt 50, and similar countersinks and bores are provided in moving block 120. However, optionally, no spring 140 has been provided around bolt 150.

From the sectional view of FIG. 8, a pair of pins 160 have been substituted for the bolts 50 of preferred embodiment vise jaw insert 10. These pins 160 are preferably pressed into holes 136. Bore 126 in moving block 120 may be blind, meaning it only passes part way through and does not reach vise contacting face 122. As may be appreciated, any number of linear bearings may be provided to ensure smooth operation of vise jaw insert spring-loaded waste shield and cleaning aids 10, 110.

In normal operation, vise jaw insert spring-loaded waste shield and cleaning aids 10, 110 are placed into a vise 1. When vise 1 is closed to hold a work piece 6, moving block 20, 120 moves with movable jaw 2 of the vise and does not extend beyond blocking flange 32, 132, thereby preventing debris from falling down an opening into the lower portion of vise 1 at the same time. This intimate contact between vise contacting face 22, 122 and either one of vise jaws 2, 3 helps to keep machining waste out of countersinks 24, 124.

From the foregoing figures and description, several additional features and options become more apparent. First of all, while the preferred material used to fabricate vise jaw insert spring-loaded waste shield and cleaning aids 10, 110 is anodized aluminum, other materials may be used with associated advantages and disadvantages. Hard plastics or stiff rubber may embed machining chips, and so may also have a short useful life. Nevertheless, in some circumstances a more resilient vise insert may be important. Resilient materials and other somewhat softer materials can lead to premature destruction if impacted with tools. Once again, in some circumstances such failures can protect the hard tool or operator.

In addition, while fixed block 30 has been described as a single unitary block, in some alternative embodiments a segmented larger fixed block with multiple parts where each segment is fixed to the prior segment(s) using a clamping screw or other suitable fastener, will allow a single block to have multiple useable sizes.

While a single pair of opposed vise jaws 2, 3 are illustrated and described, sometimes during machining one or more additional jaws or machinist's parallels may be inserted between outermost jaws, in the manner of a multilayer sandwich. It will be recognized that preferred and alternative embodiment vise jaw insert spring-loaded waste shield and cleaning aids 10, 110 may be inserted between intermediate jaws or machinist's parallels as well, potentially resulting in a plurality of vise jaw insert spring-loaded waste shield and cleaning aids 10, 110 arranged in a stack between two outer jaws and one or more intermediate jaws or machinist's parallels. This capability of preferred and alternative embodiment vise jaw insert spring-loaded waste shield and cleaning aids 10, 110 to work cooperatively with intermediate jaws or machinist's parallels is used to facilitate the positioning of work pieces within a vise or the stacking of a plurality of work pieces so that multiple work pieces can be cut, milled, or drilled without requiring any readjustment or movement of vise jaws 2, 3.

As may be apparent, preferred and alternative embodiment vise jaw insert spring-loaded waste shield and cleaning aids 10, 110 offer much utility in manufacturing where machining operations are consistently repeated on similar or like work pieces, both by reducing the time spent setting up each operation and by eliminating or substantially reducing the time required for cleaning the vise, including screw and bushing, subsequent to machining There is no additional handling of the present inventive vise jaw inserts 10, 110 required between work piece replacements, and a single vise opening and closing cycle can be used to capture and position multiple work pieces.

The vise jaw inserts 10, 110 most preferably have a generally smooth and planar top surface that shields the vise screw spindle, bearings, or bushings, and other mechanisms of the vise from machining debris and oil, and which is readily cleaned when desired or required. In addition, embodiments of the present invention offer benefit in catching small parts, tools, or the like that may be accidentally dropped onto the flat top surface of the insert for easy retrieval. Further, the substantially smooth top surface may be wiped with a cleaning rag, or can instead be blown off in the ordinary manner. Either way, the cleaning operation is greatly facilitated and required less frequently. In the event a substantial impact with a work piece or machining tool occurs, or vise jaw insert 10, 110 binds, rendering the insert permanently or temporarily unuseable, then the vise jaw insert 10, 110 can be removed easily and replaced.

Blocking flanges 32, 132 in preferred and alternative embodiment vise jaw inserts 10, 110 are illustrates as being formed unitarily with fixed blocks 30, 130. In some alternative embodiments, blocking flanges 32, 132 will be formed unitarily with and extend from moving blocks 20, 120. Either of these unitarily formed configurations are preferred, owing to the ease of fabrication and inherent strength and stability. Nevertheless, in some other alternative embodiments blocking flanges 32, 132 are separately fabricated and subsequently adhered or affixed to an associated block. In yet other alternative embodiments, blocking flanges 32, 132 are wholly separate members that have travel limited by a travel limiting member so as to ensure coverage of the variable-width gap between fixed blocks 30, 130 and moving blocks 20, 120. A travel limiting member will be understood herein to be a member that secures a blocking flange to at least one or both of fixed and moving blocks in such as manner as to ensure that the variable-width gap remains covered. For exemplary and non-limiting purpose, a travel limiting member may comprise an elastic or resilient member such as a spring or elastomeric sheet, a travel-limited slide, or other feature or member as will be recognized in the mechanical arts.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. In combination, a machine vise and a vise jaw insert spring-loaded waste shield and cleaning aid, said machine vise having:

a pair of opposed jaws each defining a contact face in a vertical plane; and a linear actuator reciprocating at least a first one of said pair of opposed jaws relative to a second one of said pair of opposed jaws;

said vise jaw insert spring-loaded waste shield and cleaning aid having:

a fixed block defining a vertical planar first surface engaging said contact face of said first one of said pair of opposed jaws, and a horizontal planar second surface extending from said fixed block first surface, said fixed block second surface defining a covering over said machine vise actuator configured to support work pieces during a machining operation and configured to shield said machine vise actuator from machining waste generated during said machining operation;

a moving block defining a vertical planar first surface engaging said contact face of said second one of said pair of opposed jaws, and a horizontal planar second surface extending from said moving block first surface, said moving block second surface defining a covering over said machine vise actuator configured to support work pieces during said machining operation and configured to shield said machine vise actuator from machining waste generated during said machining operation;

a linear bearing coupling said moving block to said fixed block and defining a first axis of reciprocation of said moving block relative to said fixed block;

a variable-width gap extending between said fixed block and said moving block along said first axis of reciprocation;

a spring applying a spring force along said first axis of reciprocation to each of said fixed block and said moving block, said spring force configured to secure said fixed block first surface to said contact face of said first one of said pair of opposed jaws through a range of reciprocating motion by at least said first one of said pair of opposed jaws relative to said second one of said pair of opposed jaws, said spring force also configured to secure said moving block first surface to said contact face of said second one of said pair of opposed jaws through said range of reciprocating motion, and said spring force configured to tend to separate said fixed block from said moving block; and a blocking flange unitary with and extending from said fixed block covering said variable-width gap between said fixed block and said moving block and thereby configured to shield said machine vise actuator from machining waste.

2. The combination machine vise and vise jaw insert of claim 1, wherein said spring further comprises a helical compression spring coaxial with and circumscribing a portion of said linear bearing.

3. The combination machine vise and vise jaw insert of claim 2, wherein said fixed block and said moving block are configured so that an excessive force component that is applied by said linear actuator along said first axis of reciprocation at a compressive limit of travel of said moving block toward said fixed block, and that is only that portion of a force applied by said linear actuator that exceeds said spring force applied opposite thereto by said spring, is transmitted from said moving block to said fixed block while circumventing said spring.

4. The combination machine vise and vise jaw insert of claim 3, wherein said fixed block further comprises a spring receiving chamber, said spring configured to compress into said spring receiving chamber at said compressive limit of travel.

5. The combination machine vise and vise jaw insert of claim 1, wherein said moving block further comprises:

a vertical planar third surface parallel and distal to said moving block vertical planar first surface;

a generally cylindrical countersink extending partially into said moving block from said moving block first surface and defining a longitudinal axis extending parallel to said first axis of reciprocation and defining a countersink diameter; and a generally cylindrical bore defining a bore diameter extending longitudinally coaxial with said bore longitudinal axis that is smaller than said countersink diameter, said bore passing through said moving block from said countersink to said moving block third surface.

6. The combination machine vise and vise jaw insert of claim 5, further comprising a bolt having a bolt first end anchored into said fixed block, a head distal to said bolt first end defining a head diameter greater than said bore diameter and smaller than said countersink diameter, and a shoulder extending substantially from said head to said bolt first end defining a longitudinal axis substantially coaxial with said bore longitudinal axis;

wherein said linear bearing comprises said bore in sliding contact with said shoulder.

7. The combination machine vise and vise jaw insert of claim 6, wherein said bolt further comprises a socket head shoulder bolt.

8. In combination, a machine vise and a vise jaw insert spring-loaded waste shield and cleaning aid, said machine vise having:

a pair of opposed jaws; and an actuator moving at least a first one of said pair of opposed jaws relative to a second one of said pair of opposed jaws;

said vise jaw insert spring-loaded waste shield and cleaning aid having:

a fixed block defining a fixed block first surface facing said first one of said pair of opposed jaws, and a fixed block second surface extending from said fixed block first surface, said fixed block second surface defining a covering over said machine vise actuator and configured to shield said machine vise actuator from machining waste;

a moving block defining a moving block first surface facing said second one of said pair of opposed jaws, and a moving block second surface extending from said moving block first surface, said moving block second surface defining a covering over said machine vise actuator and configured to shield said machine vise actuator from machining waste;

a linear bearing coupling said moving block to said fixed block and defining a first axis of reciprocation of said moving block relative to said fixed block;

a variable-width gap extending between said fixed block and said moving block along said first axis of reciprocation;

a spring applying a force along said first axis of reciprocation that secures said fixed block first surface to said first one of said pair of opposed jaws, secures said moving block first surface to said second one of said pair of opposed jaws, and tends to separate said fixed block from said moving block; and a blocking flange covering said variable-width gap between said fixed block and said moving block and thereby configured to shield said machine vise actuator from machining waste.

9. The combination machine vise and vise jaw insert of claim 8, wherein said actuator further comprises a linear actuator reciprocating at least a first one of said pair of opposed jaws relative to a second one of said pair of opposed jaws.

10. The combination machine vise and vise jaw insert of claim 8, wherein said moving block first surface further comprises a vertical plane, said moving block second surface further comprises a horizontal plane, and said moving block further comprises a moving block vertical plane third surface distal to and parallel with said moving block first surface.

11. The combination machine vise and vise jaw insert of claim 10, wherein said fixed block first surface further comprises a vertical plane, said fixed block second surface further comprises a horizontal plane, and said fixed block further comprises a fixed block vertical plane third surface distal to and parallel with said fixed block first surface.

12. The combination machine vise and vise jaw insert of claim 11, wherein said moving block further comprises:

a generally cylindrical countersink extending partially into said moving block from said moving block first surface and defining a longitudinal axis extending parallel to said first axis of reciprocation and defining a countersink diameter; and a generally cylindrical bore defining a bore diameter extending longitudinally coaxial with said bore longitudinal axis that is smaller than said countersink diameter, said bore passing through said moving block from said countersink to said moving block third surface;

and further comprising:

a bolt having a bolt first end anchored into said fixed block and protruding from said fixed block third surface, a head distal to said bolt first end defining a head diameter greater than said bore diameter and smaller than said countersink diameter, and a shoulder extending substantially from said head to said bolt first end defining a longitudinal axis substantially coaxial with said bore longitudinal axis;

wherein said linear bearing comprises said bore in sliding contact with said shoulder.

13. The combination machine vise and vise jaw insert of claim 12, wherein said spring further comprises a helical compression spring coaxial with and circumscribing said shoulder.

14. The combination machine vise and vise jaw insert of claim 13, wherein said fixed block and said moving block are configured so that an excessive force component that is applied by said linear actuator along said first axis of reciprocation at a compressive limit of travel of said moving block toward said fixed block, and that is only that portion of a force applied by said linear actuator that exceeds said spring force applied opposite thereto by said spring, is transmitted from said moving block to said fixed block while circumventing said spring.

15. The combination machine vise and vise jaw insert of claim 14, wherein said fixed block further comprises a spring receiving chamber, said spring configured to compress into said spring receiving chamber at said compressive limit of travel.

16. The combination machine vise and vise jaw insert of claim 12, wherein said moving block first surface engages with said second one of said pair of opposed jaws and thereby seals said bore adjacent to said moving block first surface.

17. The combination machine vise and vise jaw insert of claim 8, wherein said blocking flange comprises:

a generally planar top surface that is coplanar with said fixed block second surface; and a generally planar bottom surface spaced from and parallel with said blocking flange top surface and thereby defining a plate geometry;

wherein said blocking flange bottom surface is parallel to and immediately adjacent with said moving block second surface, and wherein said blocking flange is unitary with and protrudes from said fixed block.

18. The combination machine vise and vise jaw insert of claim 8, further comprising at least one machinist's parallel interposed between said fixed block first surface and said first one of said pair of opposed jaws.

19. A vise jaw insert spring-loaded waste shield and cleaning aid, comprising:

a generally rectangular parallelepiped fixed block defining a vertical planar first surface configured to engage with a contact face of a first one of a pair of opposed vise jaws, and a horizontal planar second surface extending from said fixed block first surface, said fixed block second surface configured to define a covering over and thereby shield a machine vise actuator from machining waste generated during a machining operation;

a generally rectangular parallelepiped moving block defining a vertical planar first surface configured to engage with a contact face of a second one of said pair of opposed jaws, and a horizontal planar second surface extending from said moving block first surface, said moving block second surface configured to define a covering over and thereby shield said machine vise actuator from machining waste generated during said machining operation;

a linear bearing coupling said moving block to said fixed block and defining a first axis of reciprocation of said moving block relative to said fixed block;

a variable-width gap extending between said fixed block and said moving block along said first axis of reciprocation;

a spring applying a spring force along said first axis of reciprocation to each of said fixed block and said moving block, said spring force configured to secure said fixed block first surface to said first one of said pair of opposed jaws through a range of reciprocating motion by at least said first one of said pair of opposed jaws relative to said second one of said pair of opposed jaws, said spring force also configured to secure said moving block first surface to said second one of said pair of opposed jaws through said range of reciprocating motion, and said spring force configured to tend to separate said fixed block from said moving block; and a plate-shaped blocking flange unitary with and extending from a one of said fixed block and said moving block, said blocking flange covering said variable-width gap between said fixed block and said moving block and thereby configured to shield said machine vise actuator from machining waste generated during said machining operation.

20. The vise jaw insert of claim 19, wherein said fixed block and said moving block are configured so that an excessive force component that is applied by said linear actuator along said first axis of reciprocation at a compressive limit of travel of said moving block toward said fixed block, and that is only that portion of a force applied by said linear actuator that exceeds said spring force applied opposite thereto by said spring, is transmitted from said moving block to said fixed block while circumventing said spring.

* * * * *